(12) United States Patent
Evanovich et al.

(10) Patent No.: US 6,979,397 B2
(45) Date of Patent: Dec. 27, 2005

(54) DYNAMIC PARTICLE REMOVING FLUSHING SYSTEM

(75) Inventors: Steven R. Evanovich, Pittsburgh, PA (US); Alexander D. Kiderman, Pittsburgh, PA (US)

(73) Assignee: Schroeder Industries, LLC, Leetsdale, PA (US)

( * ) Notice: Subject to any disclaimer, the term of this patent is extended or adjusted under 35 U.S.C. 154(b) by 267 days.

(21) Appl. No.: 10/392,318

(22) Filed: Mar. 19, 2003

(65) Prior Publication Data

US 2003/0201215 A1    Oct. 30, 2003

Related U.S. Application Data

(60) Provisional application No. 60/365,566, filed on Mar. 19, 2002.

(51) Int. Cl.[7] ............................................. B08B 9/02
(52) U.S. Cl. .............. 210/96.1; 210/143; 210/168; 210/171; 210/241; 700/271; 134/169 A; 134/56 R
(58) Field of Search .......................... 210/241, 194, 210/195.1, 171, 167, 168, 143, 85, 96.1; 700/271; 702/25; 356/70; 73/53.07; 123/198 A; 134/169 A, 169 C, 56 R, 113

(56) References Cited

U.S. PATENT DOCUMENTS

| | | | |
|---|---|---|---|
| 3,394,812 A | * | 7/1968 | Cohen et al. ............... 210/134 |
| 5,148,945 A | | 9/1992 | Geatz |
| 5,248,393 A | | 9/1993 | Schumacher et al. |
| 5,288,398 A | | 2/1994 | Angelino |
| 5,330,636 A | * | 7/1994 | Reichert .................... 210/96.1 |
| 5,344,570 A | | 9/1994 | McLachlan et al. |
| 5,352,347 A | * | 10/1994 | Reichert ..................... 204/665 |
| 5,482,062 A | * | 1/1996 | Chen ......................... 134/56 R |
| 5,500,095 A | | 3/1996 | Shinagawa et al. |
| 5,517,427 A | * | 5/1996 | Joyce .......................... 702/50 |
| 5,547,584 A | | 8/1996 | Capehart |
| 5,676,842 A | * | 10/1997 | Bedi et al. .................. 210/739 |
| 5,833,867 A | | 11/1998 | Hensley |
| 5,868,925 A | | 2/1999 | Turchetti |
| 5,889,683 A | * | 3/1999 | Ismail et al. ................ 700/272 |
| 6,151,108 A | | 11/2000 | Kwon et al. |
| 6,168,048 B1 | | 1/2001 | Xu et al. |
| 6,444,119 B1 | * | 9/2002 | Mains, Jr. .................... 210/85 |
| 6,560,546 B1 | * | 5/2003 | Shenk et al. ................. 702/30 |

* cited by examiner

*Primary Examiner*—Terry K. Cecil
(74) *Attorney, Agent, or Firm*—Blynn L. Shideler; Krisanne Shideler; BLK Law Group

(57) ABSTRACT

A portable, controllable fluid filtration flushing system with automated feedback, remote access, and documented operation is designed for hydraulic fluid or the like and has a base mounted on wheels for transporting the system. A filtration system mounted on the base is connectable to the hydraulic fluid system of the machine to be flushed. Feedback sensors mounted on the base, such as a particulate sensor or particle counter, are coupled to the filtration system. A programmable logic controller (PLC) is mounted on the base to control and document the operation of the flushing system. An operator input mechanism, such as a touch screen or keypad, may be on the base. The PLC is remotely accessible by an operator such as through the Internet, hardwire connection, RF connection, or the like.

20 Claims, 3 Drawing Sheets

DYNAMIC PARTICLE REMOVING FLUSHING SYSTEM

CROSS REFERENCE TO RELATED APPLICATION

This application claims the benefit of U.S. Provisional Patent Application Ser. No. 60/365,566, filed Mar. 19, 2002, which is incorporated herein by reference.

BACKGROUND OF THE INVENTION

1. Field of the Invention

The present invention relates to a portable, controllable filtration system. More particularly, the present invention relates to a portable, dynamically controllable fluid filtration flushing system with automated feedback, remote access, and documented operation.

2. Description of Related Art

Filtration systems for removing particulate and other contaminants from a wide variety of fluids are well known. In mechanical devices (e.g., fork lifts, cranes, dump trucks, CNC lathes, drill presses, cutting tables, etc.), circulated fluid, such as lubricating oil or hydraulic fluid, will incorporate a filtration system to remove particulate and other contaminants. Schroeder Industries produces a wide variety of filtration systems for such applications. In constructing such mechanical devices, it is required that the circulating fluid systems are sufficiently clean when the product is assembled and shipped. Consequently, a circulating fluid cleaning operation may be performed prior to product shipment. This cleaning operation is often called a flushing operation. With the advent of certification standards, such as ISO 9000, it is important that such operations be documented.

Additionally, computer or programmable logic controller (PLC) controlled filtration systems have been utilized in a wide variety of filtration systems. These controlled systems often utilize feedback from control sensors, such as particle counters, flow sensors, and pressure sensors, to automate the operation. Representative examples from a wide variety of applications are illustrated in U.S. Pat. Nos. 5,248,393; 5,148,945; 5,868,925; 5,547,584 and 5,500,095 that are incorporated herein by reference.

It is an object of the present invention to provide a dynamic particle removing flushing system. It is a further object of the present invention to provide a particle removing flushing system that is portable and fully automated. It is a further object of the present invention to provide a particle removing flushing system that is remotely accessible and remotely controllable. It is a further object of the present invention to provide a particle removing flushing system that documents the flushing operation. It is a further object of the present invention to provide a particle removing flushing system that is easily modified by the user for the desired flushing procedure. It is a further object of the present invention to provide a particle removing flushing system that is particularly adapted for use with flushing of circulating fluid of a machine. It is a further object of the present invention to provide a particle removing flushing system that provides automatic and manual flushing operation with continuous cleanliness monitoring and display thereof. It is a further object of the present invention to provide a particle removing flushing system that provides documented printed results locally or remotely and allows for adjusted flow patterns to meet different applications.

SUMMARY OF THE INVENTION

The above objects are achieved with the portable, controllable fluid filtration flushing system with automated feedback, remote access, and documented operation according to the present invention. In one specific embodiment of the present invention, the fluid filtration flushing system is designed for hydraulic fluid and has a base that may be mounted on wheels for holding and easily transporting the system. A filtration system is mounted on the base and is connectable to the hydraulic fluid system of the machine to be flushed. The filtration system is comprised of a collection of filter stands each housing a filter element, a pump, and piping and valving associated with the filter stands. The individual filter stands may be connected in series or in parallel depending of the desired operation as known in the art. Coupled to the filtration system are feedback sensors mounted on the base, such as a particulate sensor or particle counter, which provide real time information for controlling the flushing system. A programmable logic controller (PLC) is mounted on the base and is used to control the flushing system and provide the documentation of the operation. The documentation sets forth information, such as filtration conditions and cleanliness. The documentation can be printed with a printer attached to the PLC or remotely, or be downloaded to an associated storage device or computer. The documented record may also be displayed at the system and/or remotely during the flushing operation. The PLC will control the operation of the filtration system in a conventional fashion and receive feedback from the operational sensors while providing the ability to record, display, and document the operation. The PLC may include an operator input mechanism on the base, such as a touch screen or keypad. Additionally, it is preferred that the PLC is remotely accessible by the operator, such as through the Internet, hardwire connection, RF connection or the like. In this manner, the operator can remotely set the desired operating parameters, start the system, check the ongoing flushing process, or review a previous completed process. These and other advantages of the present invention will be clarified in the description of the preferred embodiments.

DESCRIPTION OF THE PREFERRED EMBODIMENTS

Figure 1:
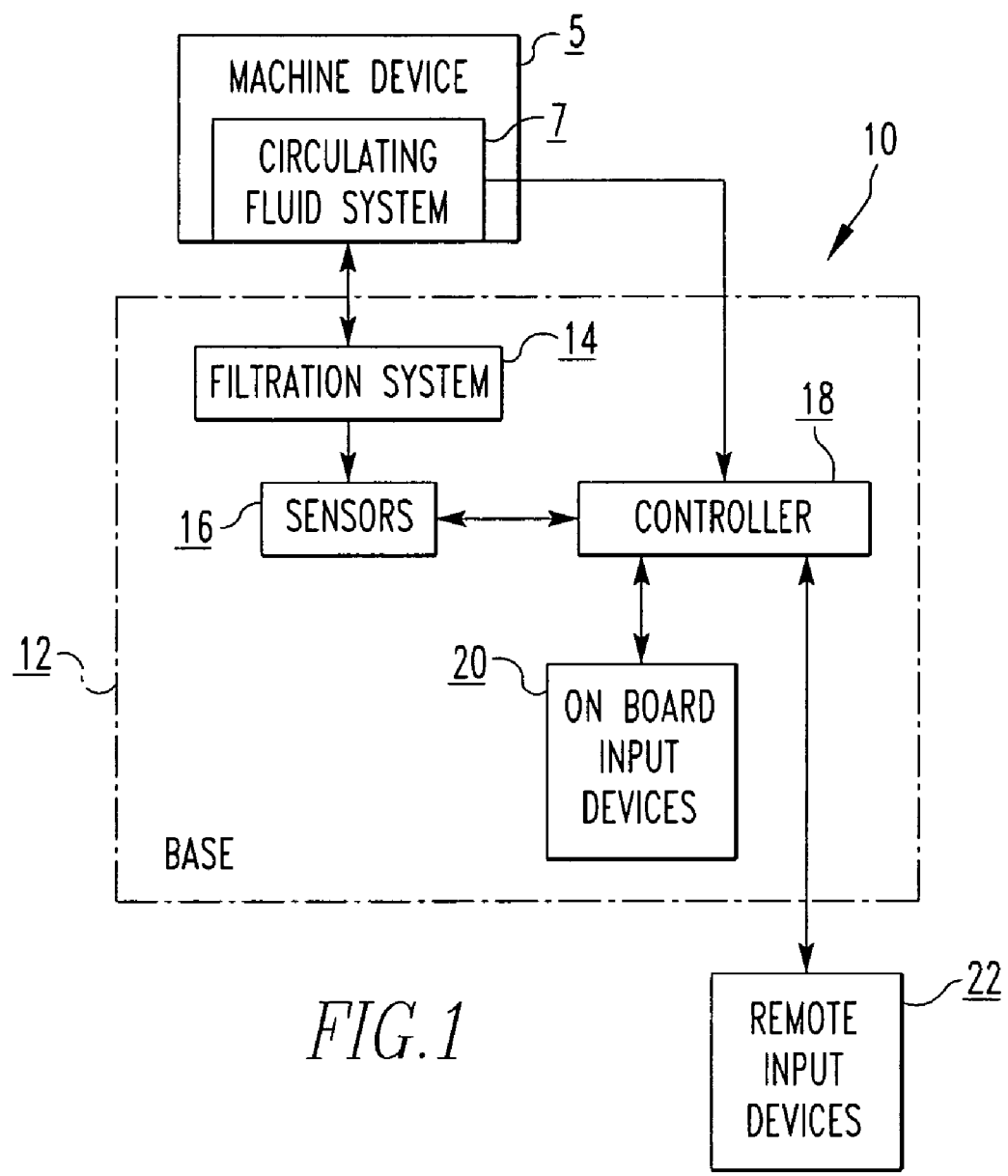
FIG. 1 is a schematic view of a dynamic particle removing flushing system according to the present invention.

FIG. 1 is a schematic view of a dynamic particle removing flushing system 10 according to the present invention. The portable, controllable fluid filtration flushing system 10 includes automated feedback, remote operator access, and control and documented operation. The filtration flushing system 10 can be used with any fluid, but is primarily designed for circulating fluids of machines, such as lubricating oil and hydraulic fluid. For example, a backhoe will have a hydraulic system for operating the various lifting cylinders. The filtration flushing system 10 of the present invention allows the manufacturer to easily flush the hydraulic system of the backhoe prior to product shipment to provide the hydraulic fluid in the desired cleanliness level.

Further, this level can be easily changed by the user and the entire process documented, if needed.

In one specific embodiment of the present invention, schematically illustrated in FIG. 1, the fluid filtration flushing system 10 has a base 12 mounted on wheels 13 for holding and easily transporting the system 10. A filtration system 14 is mounted on the base 12 and connectable to the hydraulic fluid system 7 of the machine 5 to be flushed. The filtration system 10 is comprised of a collection of filter stands each housing a filter element. The individual filter stands may be connected in series or in parallel depending on the desired operation as known in the art. The details of a specific filtration system 10 can be found in co-pending U.S. patent application Ser. No. 10/360,590 entitled "Hydraulic Filter With One-Piece Input End Cap", which is incorporated herein by reference.

Coupled to the filtration system 14 is at least one feedback sensor 16 that is also mounted on the base 12. The at least one sensor 16 (hereinafter sensors 16) preferably includes a particulate sensor or particle counter for measuring the quality of the hydraulic fluid during the flushing operation. A wide variety of sensors 16 may be utilized including pressure sensors, flow sensors, temperature sensors, and the like, all of which provide real time information regarding the state of the fluid being flushed that may be helpful for controlling the flushing system 10. The variety and operation of specific sensors 16 will be known to those of ordinary skill in the art.

A programmable logic controller (PLC) 18 is mounted on the base 12 and is used to control the flushing system 10 and provide the documentation of the operation. The PLC 18 will control the operation of the filtration system 10 in a conventional fashion and receive feedback from the operational sensors 16 while providing the ability to record, display and document the operation. Optionally, the PLC 18 will receive input from sensors on the circulating fluid system 7 of the machine 5 being flushed. At least one operator input mechanism 20 is mounted on the base 12, which preferably is in the form of a touch screen. The PLC 18 may be adapted for additional operator input, such as through a keypad or the like. Additionally, an important aspect of the present invention is that the PLC 18 is remotely accessible by the operator through a remote input device 22. The remote input device 22 may form the connection with the PLC 18 through an Internet connection, a hardwire connection, an RF connection, or the like. In this manner, the operator can remotely set the desired operating parameters, start the system, check the ongoing flushing process, or review a previous completed process.

Figure 2:
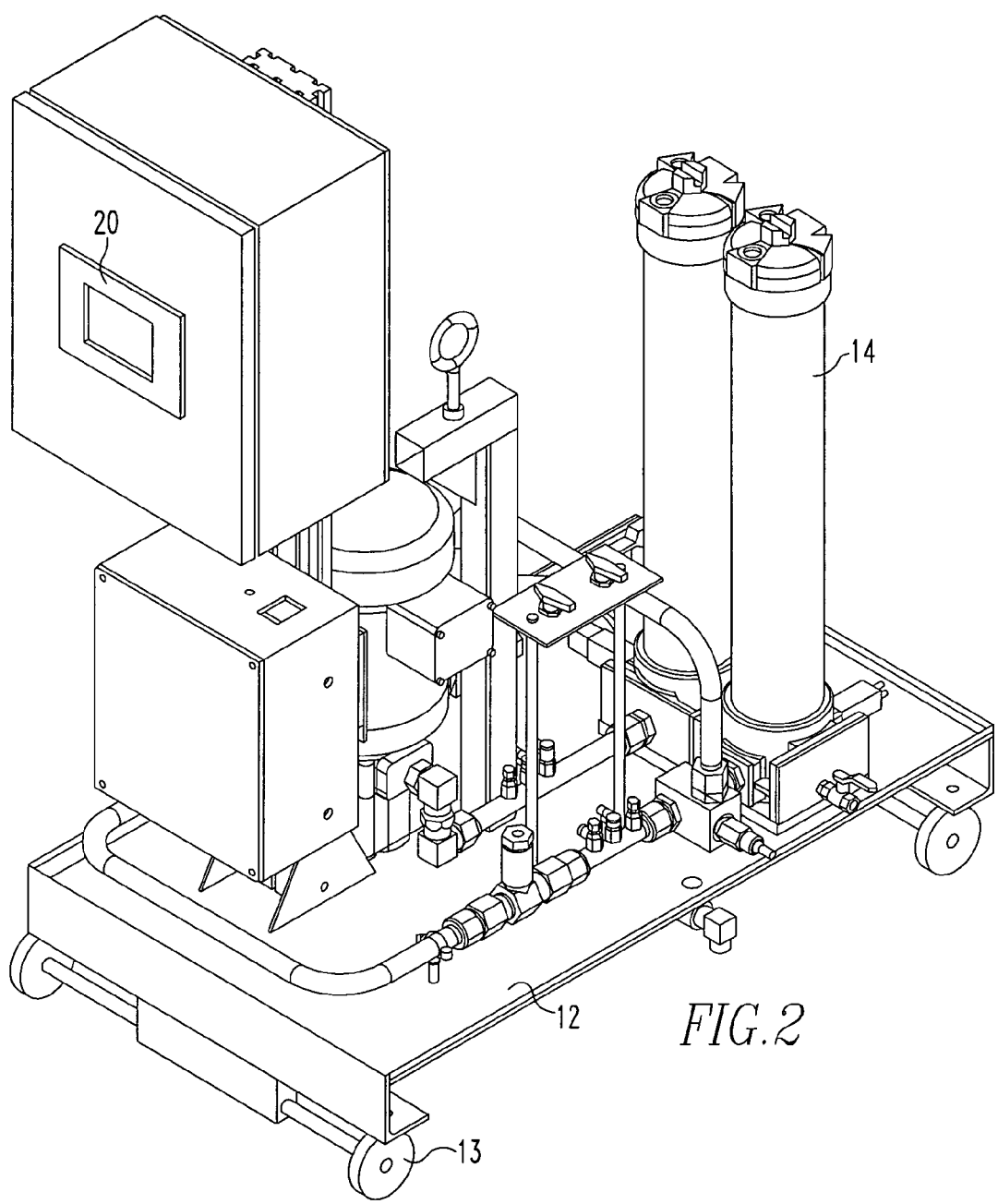
FIG. 2 is a perspective view of one embodiment of a flushing system illustrated in FIG. 1.
Figure 3:
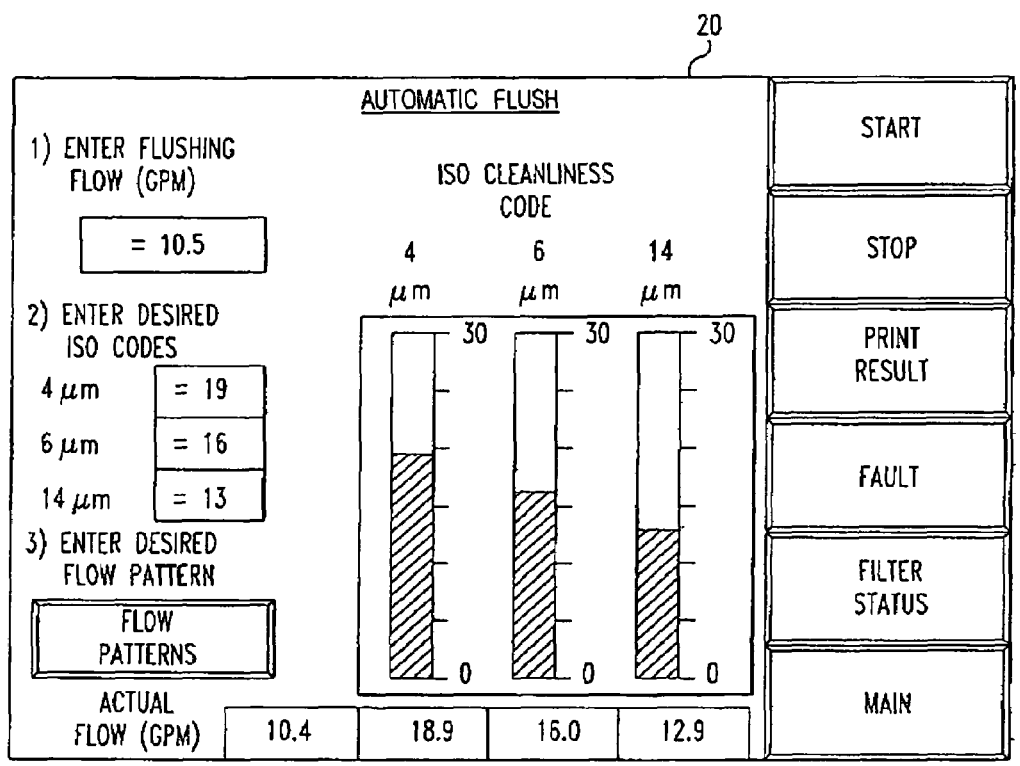
FIG. 3 is a sample of a touch screen for use on the flushing system according to the present invention.

FIG. 2 illustrates a system 10 formed according to the schematic illustrated in FIG. 1 and designed for flushing hydraulic fluid of machines. The advantages of the compact, portable flushing system 10 of the present invention will be apparent to those of ordinary skill in the art from the above and a brief review of the operation thereof. The operator connects the filtration system 14 to the circulating fluid system 7 of the machine 5 to be flushed. In actuality, the operator may be removed from the location of the flushing system 10 and the machine 5 which may be on the shop floor, such that the operator is directing this initial operation. Through an input device (20 or 22), the operator will select the desired cleanliness of the hydraulic fluid following the flushing operation and input this into the PLC 18 and start the flushing cycle. During the flushing cycle, the sensors 16 (together with sensors on the machine 5 if these are coupled to the PLC 18) will provide feedback to the PLC 18 for controlling the flushing operation. The PLC 18 may also record this information to provide documentation for the process. This record may be displayed at the system 10, such as on the touch screen shown in FIG. 3. The touch screen in FIG. 3 also serves as the input device 20. A touch screen as an input device is particularly well suited for shop environments. Further, this real time information may be displayed to the operator remotely. Further, the documentation or record may be printed through a printer (not shown) attached to the PLC 18 or remotely printed using the connection for the remote input devices 22. The record may be downloaded to a computer for archiving or analysis, or the like. The operator can change the operation of the flushing system through the PLC 18 during the flushing cycle or before the next flushing cycle providing for the dynamic interactive aspects of the flushing system 10. Typically, the PLC 18 will automatically shut the flushing system 10 down after the desired characteristics are achieved (e.g., desired cleanliness, amount of flow through the filtration system 14, etc.). The flushing system 10 can then be disconnected from the machine 5.

The system 10 may simply be tracking the amount of contaminants in the fluid being flushed with the PLC 18 acting only to shut off the pump of the filtration system 14 when the desired cleanliness is achieved. The system 10 contemplates a more complex control structure. For example, the sensors 16 may include particulate and/or flow sensors on the individual filter stands with the PLC 18 shunting flow from one filter stand to a second parallel filter stand when the first filter stand has ceased effectively cleaning the fluid (as determined by the filter stand sensors). The PLC 18 may signal (audible and/or visual) to the operator and/or to those around the base 12 when a filter element needs to be replaced or when a dangerous operating condition is sensed. The PLC 18 will automatically shut off if dangerous operating conditions are detected. The function and operation of the PLC 18 will be known to those of ordinary skill in the art.

The system 10 may include manual input in addition to the input devices 20. The manual inputs may be an emergency stop button as well as an "on" button. The "on" and emergency stop buttons are particularly helpful with remote operator control. The "on" button allows the PLC 18 to resume operation after an emergency stop or after an operator has designated the operating parameters remotely and is waiting for those on site to select a desired starting time for the flushing cycle.

The present invention provides a dynamic interactive flushing system 10 with automatic or manual flushing with continuous monitoring and display. The system 10 is provided with a touch screen input device 20 that serves as a display device. The PLC 18 allows the user to accommodate different flow patterns for different component needs and to access and control the system remotely.

The present invention has been described with reference to the preferred embodiment. Modifications and alterations will occur to others upon reading and understanding the proceeding detailed description. It is intended that the invention be construed as including all such modifications and alterations.

What is claimed is:

1. A portable fluid filtration flushing system for flushing circulating fluid of a circulating fluid system of a machine, the flushing system comprising:

A) a portable base;

B) a mechanism for coupling the flushing system to the circulating fluid system of the machine;

C) a filtration system mounted on the base and connectable to a fluid system holding the circulating fluid of the machine to be flushed through the coupling mechanism, the filtration system including a collection of filter stands with each filter stand housing a filter element:

D) at least one feedback sensor mounted on the base providing information indicative of the cleanliness of the circulating fluid system being flushed; and E) a controller mounted on the base, coupled to the at least one feedback sensor, constructed receive a desired cleanliness level for the machine, and constructed to
   (i) control the flushing system to transmit fluid through circulating fluid system and the flushing system until the desired cleanliness level of the machine is achieved, and
   (ii) document the operation of the flushing system to evidence the cleanliness level of the machine being flushed.

2. The portable fluid filtration flushing system for flushing a machine of claim 1, wherein the controller further includes an operator input mechanism on the base for inputting the desired cleanliness level for the machine.

3. The portable fluid filtration flushing system for flushing a machine of claim 2, wherein the operator input mechanism on the base is a touch screen for inputting the desired cleanliness level for the machine.

4. The portable fluid filtration flushing system for flushing a machine of claim 1, wherein the controller is remotely accessible by the operator for remotely inputting the desired cleanliness level for the machine.

5. The portable fluid filtration flushing system for flushing a machine of claim 1, wherein the mechanism for coupling the flushing system to the circulating fluid system of the machine is constructed to both
   (i) receive the circulating fluid from the circulating fluid system and
   (ii) return the circulating fluid to the circulating fluid system of the machine.

6. The portable fluid filtration flushing system for flushing a machine of claim 1, further including wheels supporting the base for transporting the flushing system.

7. The portable fluid filtration flushing system for flushing a machine of claim 1, further including manual system controls on the base.

8. The portable fluid filtration flushing system for flushing a machine of claim 1, wherein the at least one sensor on the base includes a particle counter.

9. The portable fluid filtration flushing system for flushing a machine of claim 1, wherein the controller receives input from sensors in the circulating fluid system of the machine holding the circulating fluid being flushed.

10. A hydraulic fluid filtration flushing system for flushing hydraulic fluid of a hydraulic system for a machine, the flushing system comprising:
   A) a base;
   B) a mechanism for coupling the flushing system to the hydraulic system of the machine adapted to both
      (i) receive the hydraulic fluid from the hydraulic system and
      (ii) return the hydraulic fluid to the hydraulic of the machine:
   C) a filtration system mounted on the base and connectable to the hydraulic system of the machine through the coupling mechanism, the filtration system including a collection of filter stands with each filter stand housing a filter element;
   D) at least one feedback sensor mounted on the base providing information indicative of the cleanliness of the hydraulic system during the flushing operation; and
   E) a controller mounted on the base, coupled to the at least one feedback sensor, constructed to receive a desired cleanliness level for the machine and constructed to
      (i) control the flushing system to circulate hydraulic fluid through hydraulic system and the flushing system until the desired cleanliness of the machine is achieved, and
      (ii) document the operation of the flushing system to evidence the cleanliness level of the machine being flushed.

11. The hydraulic fluid filtration flushing system for flushing a hydraulic system for a machine of claim 10, wherein the controller is a programmable logic controller accessed both through input on the base and through remote inputs to input the desired cleanliness level for the machine.

12. The hydraulic fluid filtration flushing system for flushing a hydraulic system for a machine of claim 10, wherein the controller further includes at least one operator input mechanism for the controller on the base to input the desired cleanliness level for the machine.

13. The hydraulic fluid filtration flushing system for flushing a hydraulic system for a machine of claim 12, wherein at least one operator input mechanism on the base is a touch screen to input the desired cleanliness level for the machine.

14. The hydraulic fluid filtration flushing system for flushing a hydraulic system for a machine of claim 10, wherein the controller is remotely accessible by the operator through an Internet connection to remotely input the desired cleanliness level for the machine.

15. The hydraulic fluid filtration flushing system for flushing a hydraulic system for a machine of claim 10, further including wheels supporting the base for transporting the flushing system.

16. The hydraulic fluid filtration flushing system for flushing a hydraulic system for a machine of claim 10, further including manual system controls on the base.

17. The hydraulic fluid filtration flushing system for flushing a hydraulic system for a machine of claim 10, wherein the at least one sensor on the base includes a particle counter.

18. The hydraulic fluid filtration flushing system for flushing a hydraulic system for a machine of claim 10, wherein the controller receives input from sensors in the hydraulic fluid system of the machine.

19. An automated portable fluid filtration flushing system for flushing circulating fluid of a circulating fluid system of a machine, the flushing system comprising:
   A) a portable base;
   B) a mechanism for coupling the flushing system to the circulating fluid system of the machine;
   C) a filtration system mounted on the base and connectable to a fluid system holding the circulating fluid of the machine to be flushed through the coupling mechanism, the filtration system including a collection of filter stands with each filter stand housing a filter element;
   D) at least one feedback sensor mounted on the base providing information indicative of the cleanliness of the circulating fluid system being flushed; and
   E) a controller mounted on the base, the controller constructed to
      (i) be coupled to the at least one feedback sensor, (ii) include an operator input mechanism for inputting a desired cleanliness level for the machine,
(iii) control the flushing system to transmit fluid through circulating fluid system and the flushing system until the desired cleanliness level of the machine is achieved as determined by the at least one feedback sensor, and
(iv) document the operation of the flushing system to evidence the cleanliness level of the machine being flushed.

20. The automated portable fluid filtration flushing system for flushing a machine of claim 19, wherein the mechanism for coupling the flushing system to the circulating fluid system of the machine is constructed to both
   (i) receive the circulating fluid from the circulating fluid system and
   (ii) return the circulating fluid to the circulating fluid system of the machine.

* * * * *